March 7, 1939.   N. A. CHRISTENSEN   2,150,022
POWER CONTROLLER FOR VEHICLE BRAKES
Filed Nov. 3, 1932   2 Sheets-Sheet 1
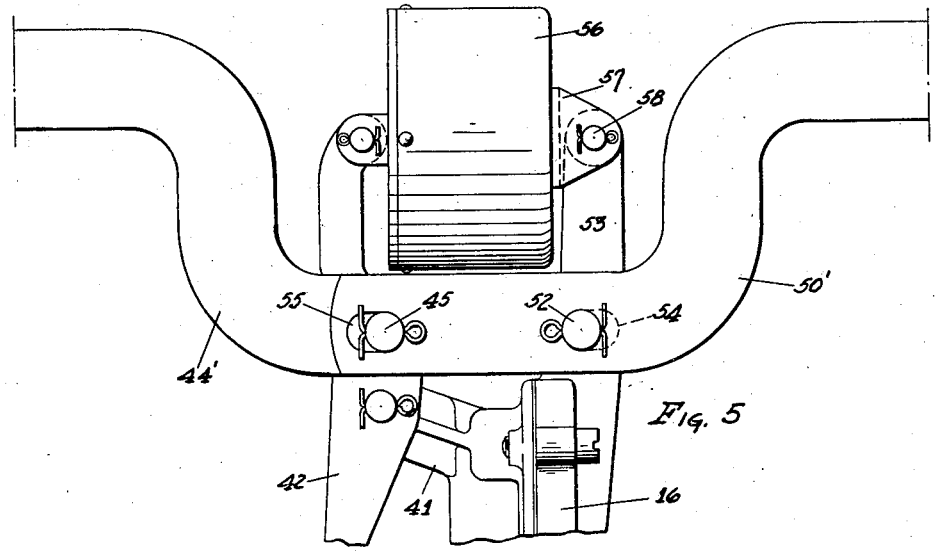
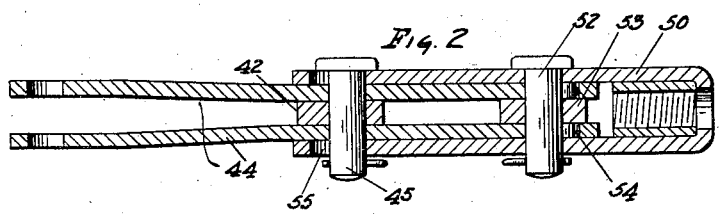
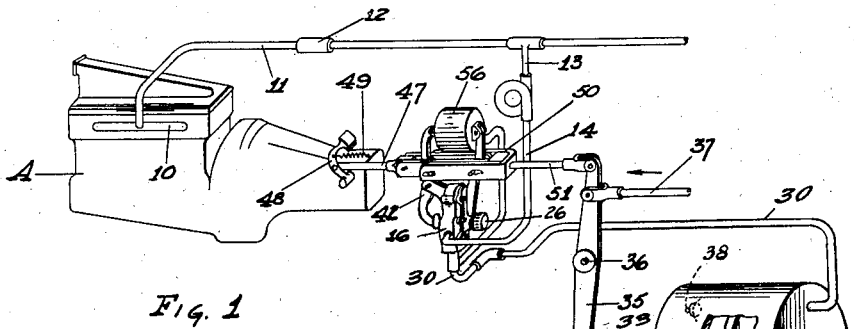
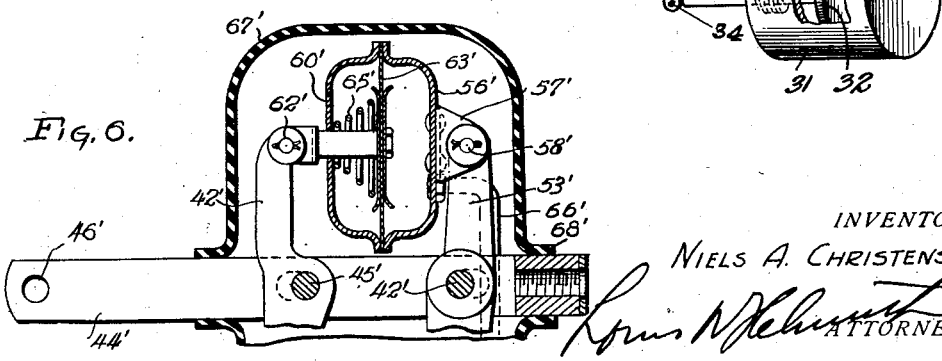
INVENTOR
NIELS A. CHRISTENSEN
ATTORNEY March 7, 1939.  N. A. CHRISTENSEN  2,150,022
POWER CONTROLLER FOR VEHICLE BRAKES
Filed Nov. 3, 1932  2 Sheets-Sheet 2
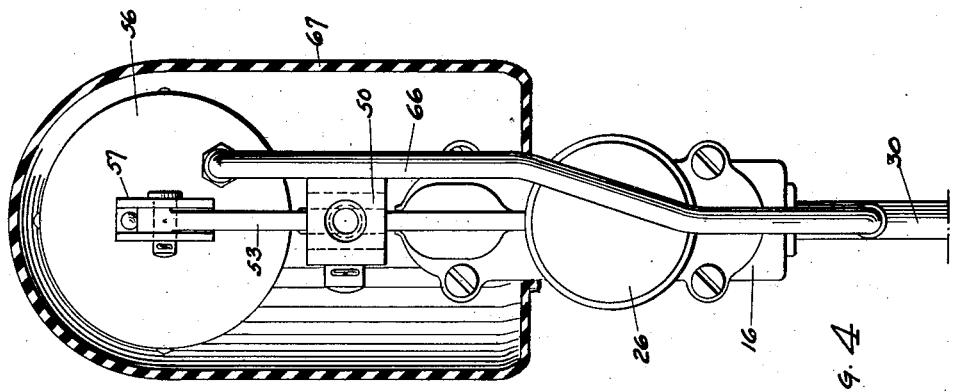
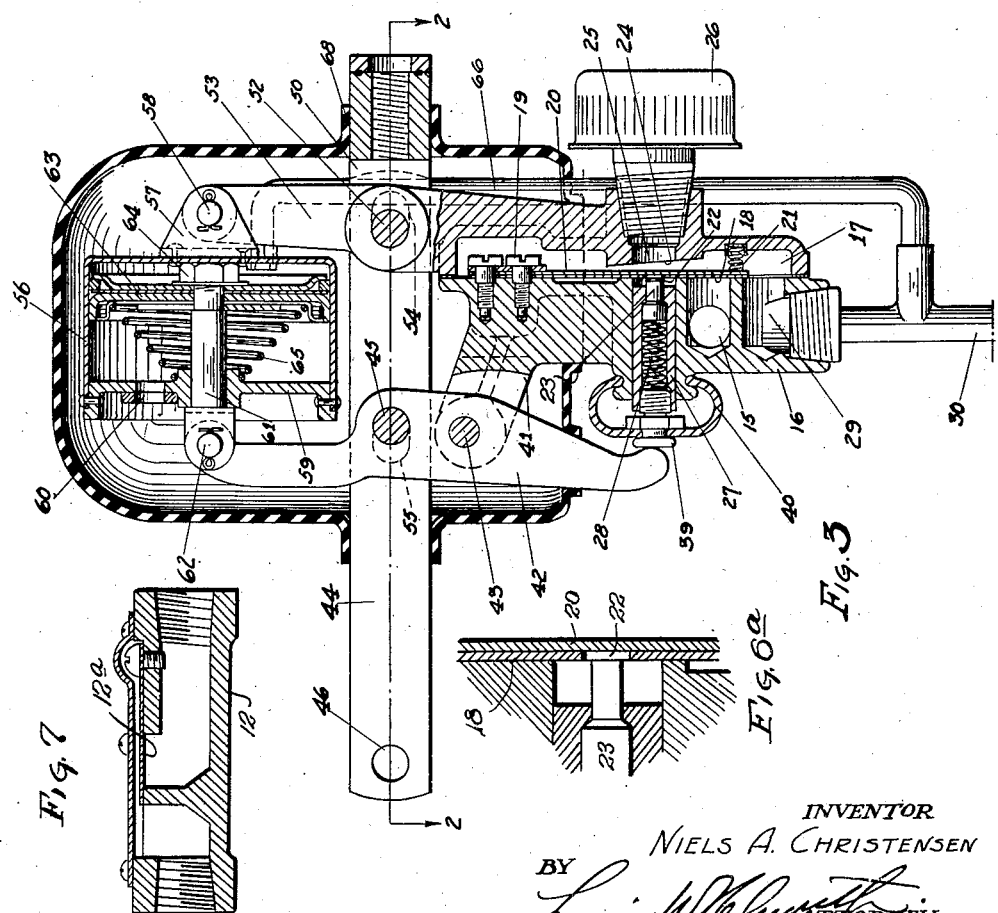
INVENTOR
NIELS A. CHRISTENSEN
BY
ATTORNEY Patented Mar. 7, 1939

2,150,022

UNITED STATES PATENT OFFICE 2,150,022

POWER CONTROLLER FOR VEHICLE BRAKES

Niels Anton Christensen, South Euclid, Ohio

Application November 3, 1932, Serial No. 641,047

6 Claims. (Cl. 188—152)

This invention relates to new and useful improvements in power controllers for power actuated mechanism and more particularly to the type employed for the power operation of motor vehicle brakes.

An important object of the invention is to provide a power controller by which the operator is given a sense of feeling of the extent to which the actuator has been moved by power, the efficacy of the device being enhanced by the fact that it is at all times under the direct control of substantially the same degree of pressure existing in the power actuator. This obviously provides an absolutely accurate index under all conditions of the amount of force being exerted by the power means on the part to be operated.

Another object of the invention is to provide this power control device in an association which permits an operator to move the part to be operated solely by the exertion of physical force should the power fail or become deficient, without placing undue strains upon the control mechanism.

Another object of the invention is to provide a power control which may be optionally used with the type of control valve illustrated in my co-pending application Serial No. 604,203, filed April 9, 1932, with a minimum change in the control valve.

A still further object of the invention is to provide a simple, durable and inexpensive protective medium for shielding the device from the deleterious effects of extraneous material.

Other objects and advantages of the invention will become apparent during the course of the following description.

In the accompanying drawings forming a part of the invention and wherein like numerals are employed to designate like parts throughout the several views, Fig. 1 is a perspective view illustrating an installation of the present improvements for the operation of mechanical brakes on an automotive vehicle, the protecting hood for the control mechanism being omitted, Fig. 2 is a longitudinal section through the linkage for coupling the control mechanism with the brake rigging and operating control device, Fig. 3 is a vertical section through the control valve and power control mechanism associated with the coupling, Fig. 4 is an end elevation of the same with the shield illustrated in transverse section, Fig. 5 is a modified form of coupling employed when an installation requires a lower disposition of the control mechanism, Fig. 6 is a section of a modified form of the reaction chamber, and Fig. 6a is an enlarged fragmentary section of a part of the control valve casing showing the leaf spring valve construction more clearly.

Fig. 7 is a longitudinal section of the check valve.

As explained in my co-pending application, Serial No. 604,203, an internal combustion engine A mounted upon the chassis of an automotive vehicle is provided with an intake manifold 10 in the usual manner, into which is tapped a pipe 11 for sub-atmospheric pressure, and if desired, this pipe may be provided with a form of check valve 12 having a flat spring valve 12a as illustrated in Figure 7. This pipe 11 is provided with a branch 13 connected by flexible tubing and pipe 14 to a suitable nipple secured in a sub-atmospheric or low pressure port 15 of a control valve casing 16. The same fastenings 19 attach one end of a second leaf spring valve 20 which is superimposed upon the valve 18, which we will term a suction valve while the valve 20 may be termed a high pressure or atmospheric valve. The inherent spring qualities of these valves retain them in the seated position shown in Fig. 3, but if desired an auxiliary spring 21 may be employed for forcing these valves to their seats, especially when the control valve is used in a vacuum suspended system instead of an air suspended system. The suction valve 18 is provided with an aperture 22 intermediate its ends to permit the projection of a spring pressed plunger 23 therethrough for moving the atmospheric valve 20 to its inclined seat 24 surrounding an atmospheric port 25 into which is threaded an air filtering device 26. A quill 27 is slidably mounted in the control valve casing to house the plunger 23 and its projecting spring 28 and is adapted to be moved into contact with the suction valve 18 to move it from its seat and establish communication between the port 15 and chamber 17 whereby sub-atmospheric pressure is established in port 29 and pipe 30 leading therefrom to one end of a power actuator cylinder 31. Within the power actuator is a piston 32 having a piston rod 33 pivotally connected as at 34 to the lower end of a lever 35 fulcrumed as at 36 upon any suitable portion of the automobile chassis. A brake rod 37 is pivotally connected to the lever 35 above the fulcrum 36 and its other end is connected to any suitable type of mechanical brake mechanism on the automotive vehicle. This brake mechanism has not been illustrated as the usual types are well understood in the art and the rod 37 may be employed to connect with any other suitable mechanism desired to be operated by the power medium. The end of the cylinder through which the piston rod 33 projects is provided with an air filter 38 which normally permits communication between the atmosphere and this end of the cylinder.

The outer end of the valve actuating quill 27 terminates in a contact head 39 upon which is mounted a cup shaped rubber dust shield 40 having its edges seated in a circumferential groove of a boss formed on the valve casing and surrounding the quill.

A lateral extension 41 projects from the upper end of the control valve casing to pivotally support a valve actuating lever 42 fulcrumed on pin 43. This lever extends up between a pair of links 44 and is connected thereto intermediate their ends by means of a transversely extending pin 45. The forward ends of these links are apertured as at 46 for connection to an arm 47 pivotally connected at its forward end to a brake operating part in the form of a pedal 48. A brake retracting spring 49 connected with the pedal and a stationary part of the chassis may be employed if desired for moving the pedal to release position.

The two links 44 are slidably mounted between the arms of a yoke 50 which is secured to a rod 51 pivotally connected to the upper end of brake lever 35. This yoke is provided with a transversely extending pin 52 which extends through an upwardly projecting arm 53 of the control valve casing and through a pair of slots 54 provided in the inner ends of the links 44. The pin 45 likewise extends through a pair of registering slots 55 provided in the free ends of the arms of the yoke 50 so that when the brake pedal is depressed, the links 44 will move independently of the yoke 50 and cause the valve actuating lever 42 to move on its fulcrum 43 to operate the valves 18 and 20. In the modified form of coupling shown in Fig. 5, the inner ends of the arms 44' and the arms of the yoke 50' are offset as illustrated and have the same connections with the valve lever and control valve casing as described for the form illustrated in Fig. 3.

This offsetting of the coupling makes provision for lowering the position of the control valve with respect to the vehicle when such is required on certain installations.

In order to provide more appreciable resistance to brake applying movement of the foot pedal in direct proportion to the differential pressures existing in the power actuator cylinder whereby the operator is given a definite index by which he is made to feel the extent to which the power actuator has applied the brakes by power, a power control device is supported upon the upper ends of the extension 53 of the valve casing and the lever 42. This control device in the present instance is illustrated in the form of a metallic cylinder 56 having one end closed to the atmosphere and pivotally connected by a U-shaped stamping 57 to the upper end of extension 53 by means of a pivot pin 58. The opposite end of this cylinder is closed by a suitable head 59 having an aperture 60 for admitting atmospheric air to the interior of the cylinder, and a central opening for the passage of a piston rod 61, the outer end of which is formed to be pivotally connected to the upper end of the lever 42 by means of the pin 62. The inner end of the piston rod is provided with a piston head 63 possessing the same construction as the piston of the power actuator disclosed in my co-pending application Serial No. 572,427, filed October 31, 1931. This piston head is adjustably mounted on the rod by means of a nut 64 threaded upon the rod and abutting one face of the piston to move it along the rod when turned in one direction and to permit it to be moved outwardly toward the free end of the rod under the influence of a compression spring 65 when turned in the opposite direction. This spring 65 is of somewhat conical form having its smaller end seating around the boss on the cylinder head, while its larger end abuts the inner face of the piston head as illustrated. The closed end of the control cylinder 56 has one end of a pipe 66 tapped therein, the other end of this pipe being connected with pipe 30 which sets up sub-atmospheric pressure in one end of the power actuator 31 when opened up to the intake manifold of the internal combustion engine by the control valve. In order to protect the control valve and power control mechanism from the deleterious effects of extraneous matter, a hood of rubber or metal 67 is provided to cloak the exposed movable elements and is equipped at opposite ends with flanged openings 68 to slip over the relatively movable parts of the coupling device as illustrated. Of course, this hood at its lower end may be shaped, when constructed of rubber, to snugly fit about the adjacent parts of the mechanism to further exclude foreign matter as illustrated in Figs. 3 and 4. It will also be understood that a flexible diaphragm 63' may be employed in the power control device 56' as shown in Fig. 6 in place of the rigid piston 63, as these are of course, well known equivalents in the art. The control chamber 56' comprises a pair of corresponding cup-shaped stampings fastened together upon the edge of the diaphragm 63'; one of the stampings having an air port 60' while the other has a connection for pipe 66'. The remaining parts of this modification which are the same as the parts of the form shown in Fig. 3, are marked with numerals corresponding to those of Fig. 3 with the addition of prime coefficients.

The operation of the device is as follows, assuming the parts be in the positions illustrated in the drawings with the brakes of the vehicle in released positions. The valves 18 and 20 being in the positions illustrated, atmospheric air, or the higher pressure of those employed, is admitted through the chamber 17 into a pipe 30 to one end of the power actuator cylinder 31, and since the opposite end of this cylinder is constantly in communication with the atmosphere, the piston 32 therein is submerged in atmospheric pressure.

To apply the brakes with power, the foot pedal 48 is depressed causing links 44 to move toward the left of the figure causing its slots 54 to move over pin 52 and the pin 45 to move in the slots 55, thereby moving the upper end of lever 42 against the tension of spring 65 and its lower end toward the right to move the quill 27 inwardly toward the valves. This movement of the valve lever is unobstructed by the piston 63 in view of the fact that equalized pressures are existent on opposite sides of the piston. Only slight movement of the foot pedal is required to move the quill sufficiently to place the spring 28 under tension and to project the plunger 23 through the vacuum valve and into contact with the air valve 20 to flex the same and move it against its seat 24 thereby cutting off communication from the atmosphere. Slight further movement of lever 42 will project the quill into engagement with the vacuum valve 18 to lift it from its seat and establish communication between the chamber 17 and suction port 15 connected with the intake manifold. This action permits sub-atmospheric pressure to exist in the pipe 30 and in one end of the power actuator cylinder 31 thereby causing the piston 32 therein to move to the right of the figure and apply the mechanical brakes by the rod 37. Instantaneously with the creation of sub-atmospheric pressure in the line 30, the same pressure per unit area is created in the right hand end of the power control cylinder 56 thereby offering additional resistance to the movement of valve the lever 42 and consequently through the links 44, rod 47 to the brake pedal; this resistance being in direct proportion to the extent of atmospheric pressure existing in one end of the power actuator, thereby accurately apprising the operator of the exact amount of power being exerted on the brake mechanism by the power actuator. As the brakes are applied, the control valve follows the movement of the foot pedal causing the suction valve 18 to automatically close upon its seat, unless the pedal is further depressed, while the air valve 20 remains seated, thereby retaining the brakes applied and the valves in "lap" position. This obviously maintains sub-atmospheric pressure in the power actuator, and most important, in the power control cylinder 56 where its effect upon impressing its resistance to the forward movement of the brake pedal is continually present under all conditions, except when the pedal is returned to brake release position. This is a most important feature, inasmuch as the resistance to foot pedal movement is ever present in direct proportion to the power exercised by the power actuator regardless of the amount of physical pressure exercised upon the pedal or the relative position of the pedal so that the operator accurately "feels" the extent of brake application at all times and is therefore better qualified to very accurately modulate or increase and decrease brake pressure as required.

Should differential pressures fail to be created in the power actuator for any reason, continued movement of the foot pedal 48 in the direction of brake application will cause the pins 45 and 52 to bottom in their respective slots 55 and 54 after taking up the lost motion, and thereby exert a direct pull on the rod 37 from the brake pedal whereby the brakes are applied solely by the physical force of the operator. Upon release of pressure from the foot pedal, the link 44 will move to the right of the figure permitting the valve operating lever 42 to return to normal position and the valves 18 and 20 to open the atmospheric port 25 and close the sub-atmospheric port 15 so that instantly equalized pressures will exist in both the actuator and control cylinders to permit the parts to automatically return to brake release position.

It is to be understood that various changes in the size, shape and arrangement of parts may be resorted to without departing from the spirit of the invention or the scope of the appended claims.

I claim:

1. The combination with a power actuator having a movable part dependent upon differential pressures for operation, an operator operated part, a control valve operated thereby and including a casing and a valve operator pivotally connected to the valve casing and a pressure responsive device pivotally connected to the valve operator, spring means positioned between said pressure responsive device and the casing acting in a direction to oppose movement of the valve operator, and a conduit connecting the casing of said pressure responsive device on one side of pressure responsive device with the power actuator.

2. The combination with a power actuator having a movable part dependent upon differential pressures for operation, an operator operated part, a control valve operated thereby and including a casing and a valve operator, pressure responsive means including a casing pivotally connected to the valve casing and a pressure responsive device pivotally connected to the valve operator, said last named casing having a port communicating the atmosphere with one side of the pressure responsive device and a conduit communicating the other side of the pressure responsive device with the power actuator and spring means positioned between the pressure responsive device and the casing acting in a direction to oppose movement of the valve operator.

3. The combination with a control mechanism, a brake element to be controlled by power or manually, a power actuator having a movable member dependent upon differential pressures connected to said element, a foot pedal, linkage between the pedal and element including a lost motion device composed of a pair of longitudinally aligned links having limited relative longitudinal movement, a valve casing supported by said linkage and including a pressure responsive member, a valve actuator supported by the linkage and connected with said pressure responsive member, and said valve actuator having independent movement relative to said linkage and valve limited by the lost motion device causing the valve casing to be moved substantially in unison with the valve actuator after a predetermined movement of the pedal.

4. The combination with a control mechanism, a brake element to be controlled by power or manually, a power actuator having a movable member dependent upon differential pressures connected to said element, a foot pedal, a lost motion device forming a connection between the pedal and said element and including a pair of relatively movable links joined by a pair of pins, each pin being movable with its respective link and relative to the other link for a limited distance, a valve casing supported by one of said pins, a valve actuator supported by the other pin, said actuator being pivotally connected to the valve casing, pressure responsive means supported by the valve, and said valve actuator being pivotally connected to said pressure responsive means.

5. The combination with a control mechanism, a brake element to be controlled by power or manually, a power actuator having a movable member dependent upon differential pressures connected to said element, a foot pedal, linkage between the pedal and element and including a pair of laterally spaced slotted links and a pivot, a valve actuator pivotally mounted between said links on a pivot, a yoke embracing said links and having slotted connection with said pivot, a pin carried by said yoke and extending through the slots of said links, a valve casing supported by said pin between said links, said valve actuator being movable with said links and independently of said yoke to a limited degree, a pressure responsive member connected to said actuator, and said links acting to move said yoke and valve when the slots of said links bottom against said pin.

6. The combination with a control mechanism, an element to be controlled by power or manually, a power actuator having a movable member dependent upon differential pressures for operation, a foot pedal, control valve means, a lost motion device separate from the valve means and forming a connection between the pedal and said element, said control valve means being movable with said element and including a pressure responsive part connected to the pedal, and said lost motion device acting upon manual application of the brakes to exert force on said element independently of said pressure responsive part and valve means to relieve the same from stress.

NIELS ANTON CHRISTENSEN.